(12) United States Patent
Boyraz

(10) Patent No.: US 9,726,794 B2
(45) Date of Patent: Aug. 8, 2017

(54) HIGH INDEX CONTRAST GRATING STRUCTURE FOR LIGHT MANIPULATION AND RELATED METHOD

(71) Applicant: The Regents of the University of California, Oakland, CA (US)

(72) Inventor: Ozdal Boyraz, Irvine, CA (US)

(73) Assignee: The Regents of the University of California, Oakland, CA (US)

(*) Notice: Subject to any disclaimer, the term of this patent is extended or adjusted under 35 U.S.C. 154(b) by 84 days.

(21) Appl. No.: 14/713,827

(22) Filed: May 15, 2015

(65) Prior Publication Data
US 2015/0362641 A1 Dec. 17, 2015

Related U.S. Application Data

(60) Provisional application No. 62/012,059, filed on Jun. 13, 2014.

(51) Int. Cl.
*G02B 5/18* (2006.01)
*G02B 1/02* (2006.01)

(52) U.S. Cl.
CPC .......... *G02B 5/1861* (2013.01); *G02B 5/1871* (2013.01); *G02B 1/02* (2013.01); *G02B 5/1809* (2013.01)

(58) Field of Classification Search
CPC .......... G02B 5/00; G02B 5/18; G02B 5/1804; G02B 5/1828; G02B 5/1838; G02B 5/1847; G02B 5/1857; G02B 5/1866; G02B 5/1871

USPC ....... 359/558, 566, 568, 569, 570, 572, 573, 359/575
See application file for complete search history.

(56) References Cited

U.S. PATENT DOCUMENTS

2009/0041971 A1* 2/2009 Wang .................. G02B 5/1809 428/54
2012/0105962 A1* 5/2012 Fattal ...................... G02B 5/08 359/575

OTHER PUBLICATIONS

Astilean et al., High-efficiency subwavelength diffractive element patterned in a high-refractive-index material for 633nm, Optics Letters, vil 23, No. 7, 552-554.*
Kaplan et. al., "Silicon as a standard material for infrared reflectance and transmittance from 2 to 5 microns", Infrared physics and technology, 43, 389-396, 2002.*

* cited by examiner

*Primary Examiner* — Scott J Sugarman
*Assistant Examiner* — Robert E Tallman
(74) *Attorney, Agent, or Firm* — Farjami & Farjami LLP

(57) ABSTRACT

A high index contrast grating (HICG) structure is disclosed. The HICG structure includes plurality of gratings fabricated from a high refractive index layer. The high refractive index layer is situated over a low refractive index substrate, wherein the high refractive index layer is patterned after determining a period and a duty cycle of each of the plurality of gratings for a desired reflection phase profile based on a lookup table. The low refractive index substrate includes sapphire. The plurality of gratings includes polycrystalline or amorphous silicon. The HICG structure includes subwavelength gratings for incident wavelengths of equal to or greater than 2.5 microns. An exemplary method for forming the HICG structure is also disclosed.

20 Claims, 9 Drawing Sheets

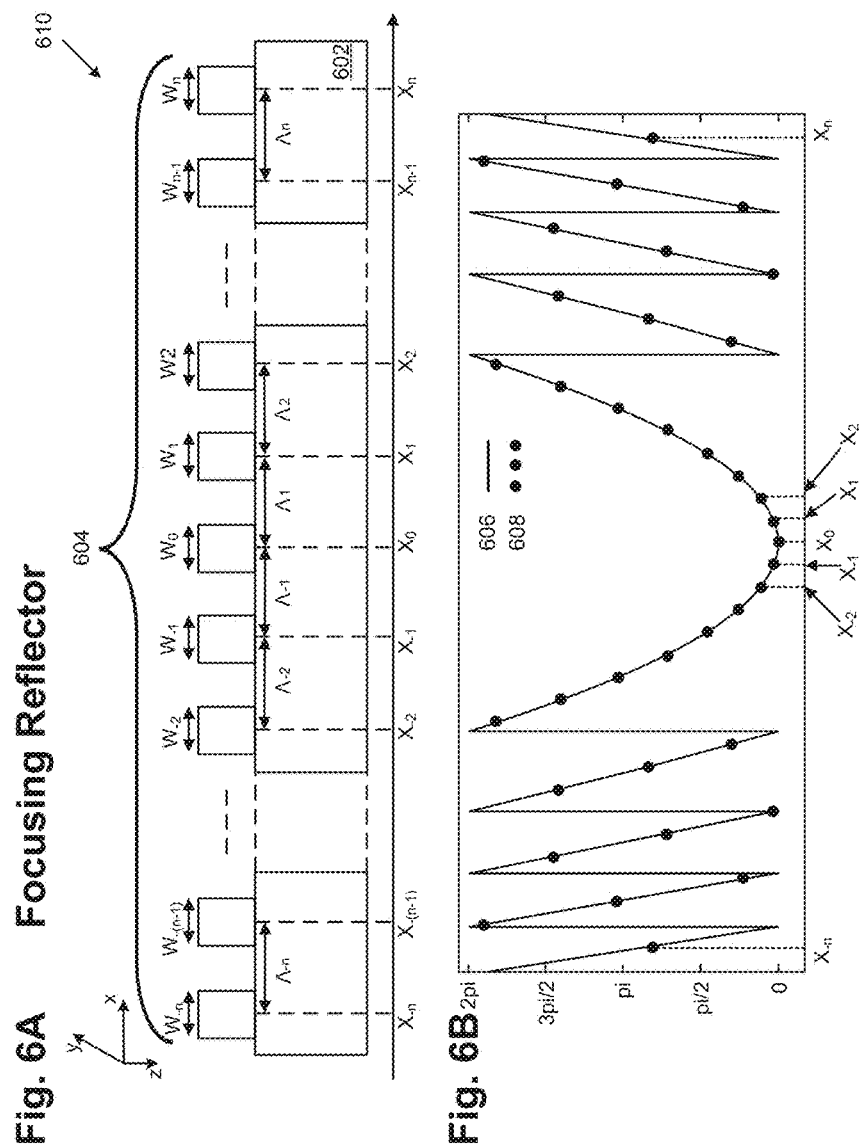

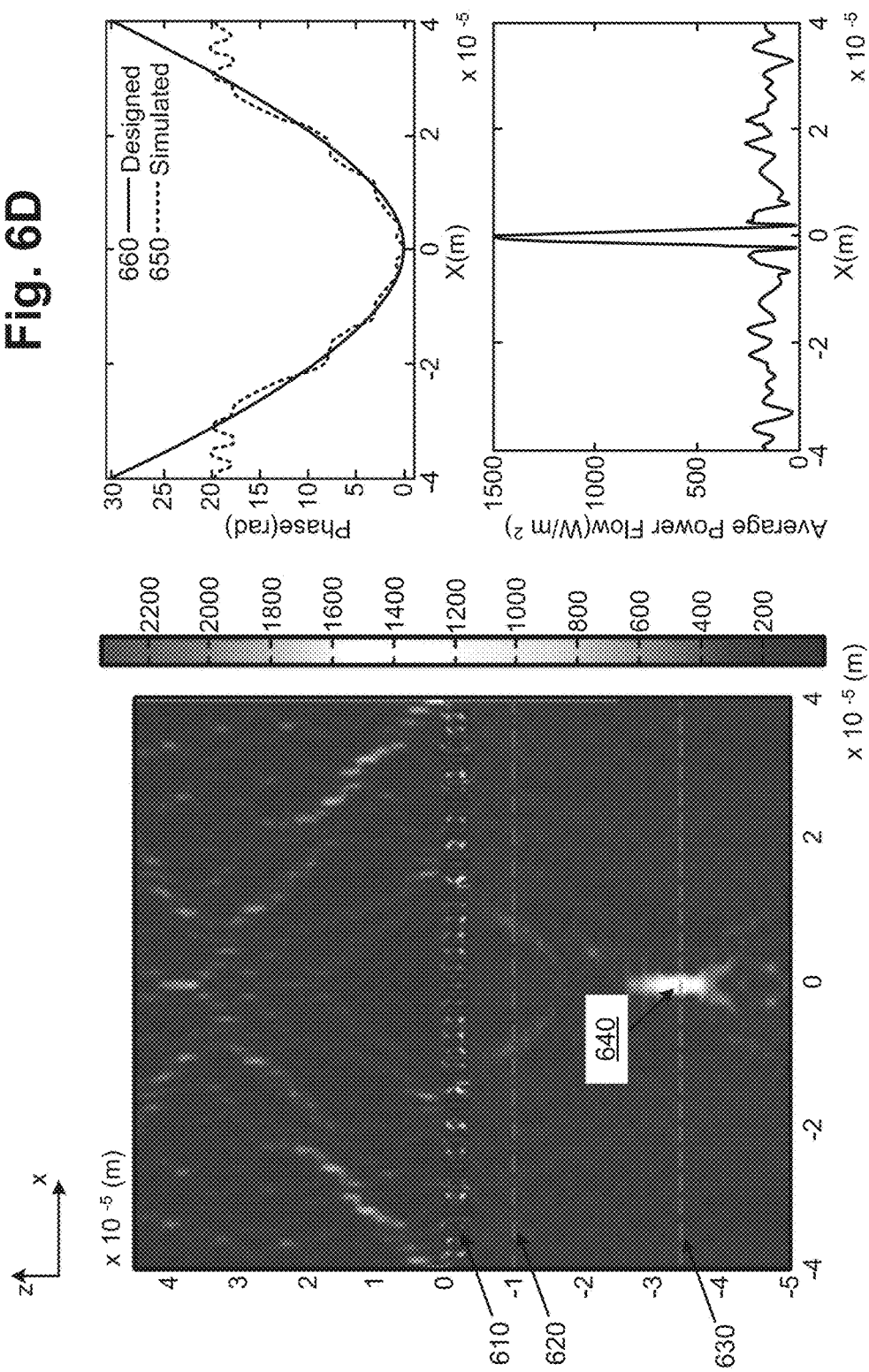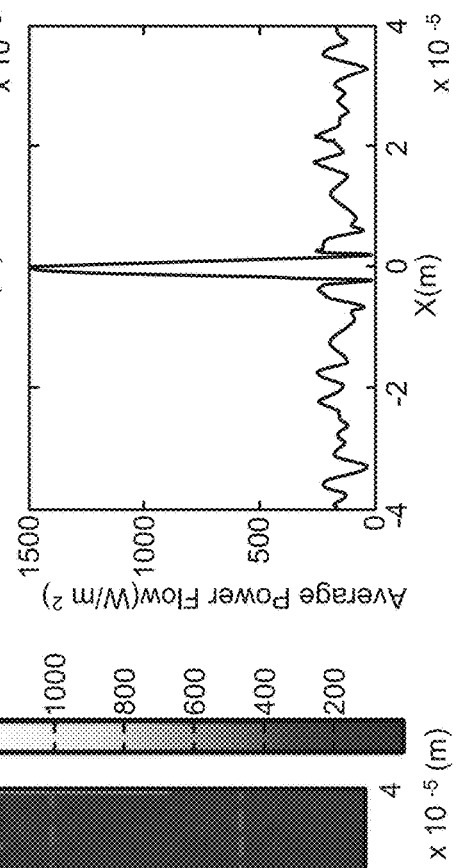

Sinusoidal Phase
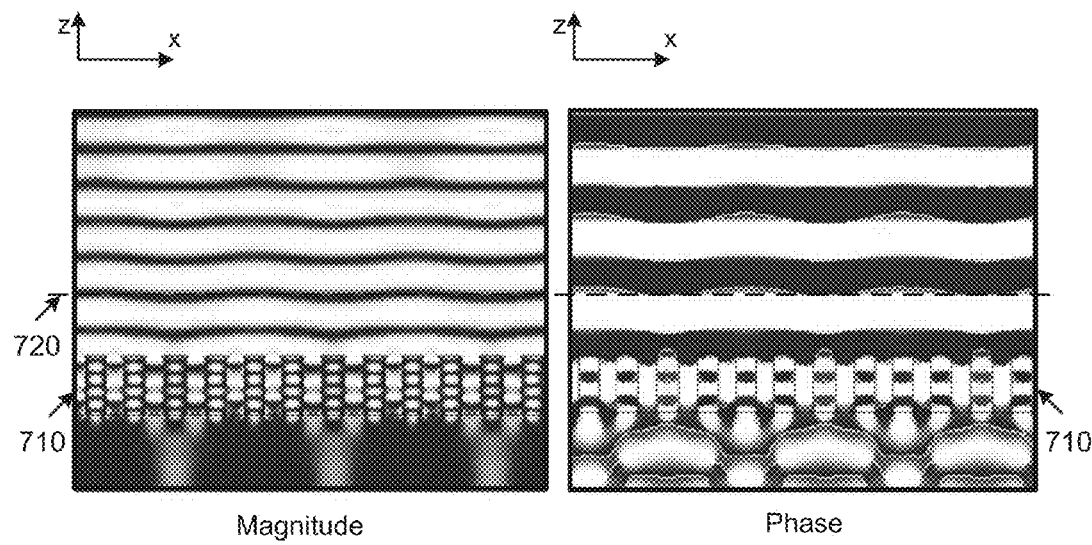
Fig. 7A  Magnitude
Fig. 7B  Phase
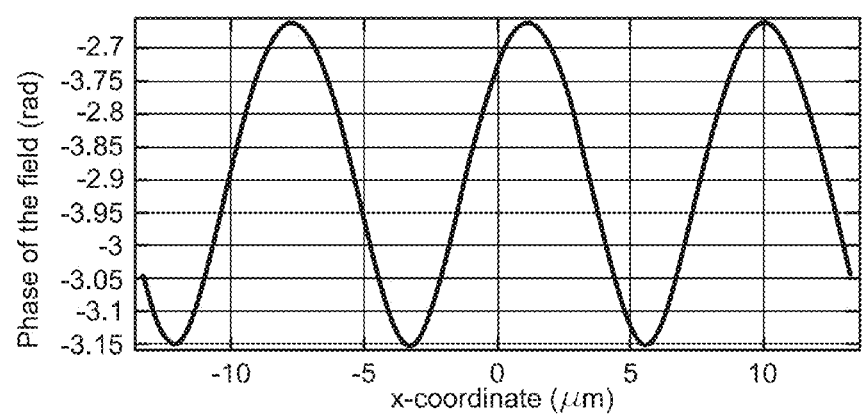
Fig. 7C

Diffraction Grating
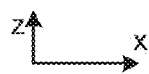
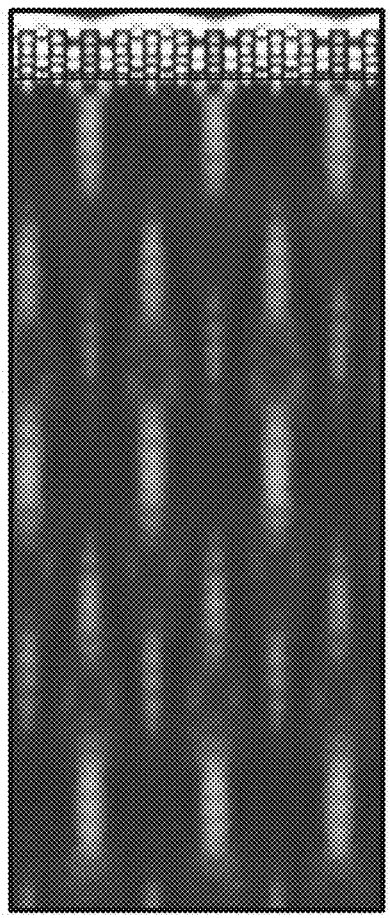
Magnitude
Fig. 8A
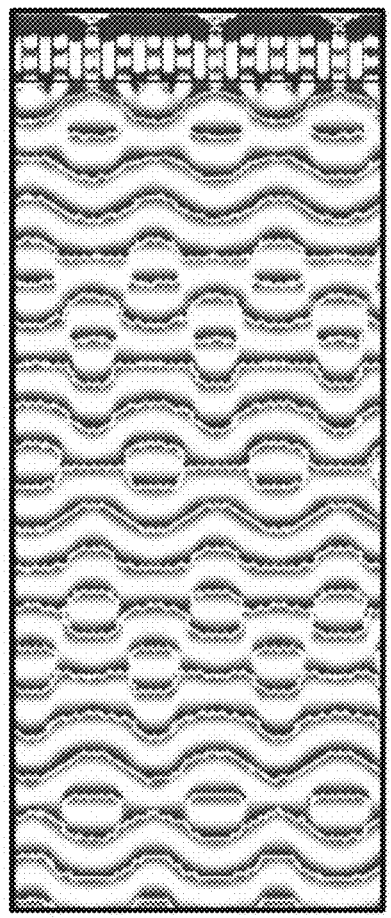
Phase
Fig. 8B

HIGH INDEX CONTRAST GRATING STRUCTURE FOR LIGHT MANIPULATION AND RELATED METHOD

The present application claims the benefit of and priority to a provisional patent application entitled "Silicon on Sapphire Based Plasmonic and Metasurface Design for Optical Light Manipulation," Ser. No. 62/012,059 filed on Jun. 13, 2014. The disclosure in this provisional application is hereby incorporated fully by reference into the present application.

BACKGROUND

The manipulation of light has a wide variety of applications in imaging, sensing, communications and optical applications. Optical components, such as lenses, mirrors, prisms, and diffraction gratings, can interact and alter the properties of light in various ways. However, these optical components are often bulky, thus difficult to integrate into modern optical systems that continue to shrink in size.

In conventional optical systems, glass or metallic gratings have been used to reflect and refract light in the visible and near-infrared spectrum range. These gratings, however, are lossy due to oxide or metal absorption in the visible and near-infrared spectrum range, thus adversely limiting the power efficiency of the conventional optical systems. Also, the conventional grating structures can only perform a single function at a time, with no general automatic design methodology present for arbitrary waveform profiles.

Thus, there is a need in the art for a low loss optical structure that can provide a range of functionalities for optical light manipulation both in and beyond the visible and near-infrared spectrum range.

SUMMARY

The present disclosure is directed to high index contrast grating structure for light manipulation and related method, substantially as shown in and/or described in connection with at least one of the figures, and as set forth in the claims.

BRIEF DESCRIPTION OF THE DRAWINGS

FIG. 6A illustrates a cross sectional view of a HICG structure functioning as a focusing reflector, according to one implementation of the present application.

FIG. 6B illustrates a phase distribution profile of a reflected wave normal incident upon the HICG structure in FIG. 6A functioning as focusing reflector, according to one implementation of the present application.

FIG. 6C illustrates a simulated field plot of a reflected wave normal incident upon a HICG structure functioning as a focusing reflector, according to one implementation of the present application.

FIG. 6D illustrates a simulated phase profile of a reflected wave normal incident upon the HICG structure in FIG. 6C, according to one implementation of the present application.

FIG. 6E illustrates a simulated power flow distribution of a reflected wave normal incident upon the HICG structure in FIG. 6C, according to one implementation of the present application.

FIG. 7A illustrates a simulated magnitude plot of a reflected wave normal incident upon a HICG structure having a reflected sinusoidal phase distribution, according to one implementation of the present application.

FIG. 7B illustrates a simulated phase plot of a reflected wave normal incident upon a HICG structure having a reflected sinusoidal phase distribution, according to one implementation of the present application.

FIG. 7C illustrates a sinusoidal phase distribution of a reflected field normal incident upon a HICG structure, according to one implementation of the present application.

FIG. 8A illustrates a simulated magnitude plot of a reflected wave normal incident upon a HICG structure having Talbot Effect, according to one implementation of the present application.

FIG. 8B illustrates a simulated phase plot of a reflected wave normal incident upon a HICG structure having Talbot Effect, according to one implementation of the present application.

DETAILED DESCRIPTION

Figure 1:
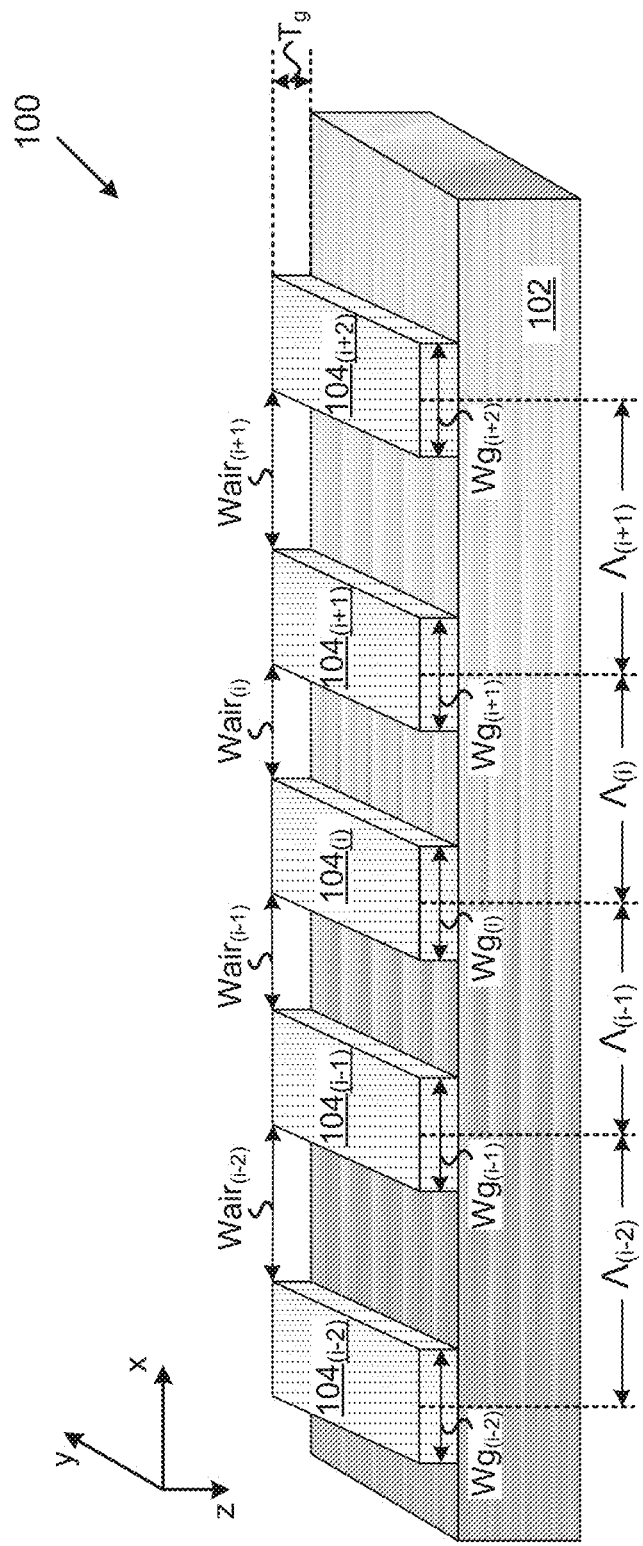
FIG. 1 illustrates a portion of a high index contrast grating (HICG) structure, according to one implementation of the present application.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 illustrates a portion of a high index contrast grating (HICG) structure, according to one implementation of the present application. As illustrated in FIG. 1, HICG structure 100 includes low refractive index substrate 102 and gratings $104_{(i-2)}$, $104_{(i-1)}$, $104_{(i)}$, $104_{(i+1)}$, and $104_{(i+2)}$. Gratings $104_{(i-2)}$, $104_{(i-1)}$, $104_{(i)}$, $104_{(i+1)}$, and $104_{(i+2)}$ are spaced apart from one another over a top planar surface of low refractive index substrate 102, and may be fabricated from a high refractive index layer, thus having substantially uniform composition.

In the present implementation, low refractive index substrate 102 may include sapphire. In other implementations, low refractive index substrate 102 may include dielectric material, such as silicon dioxide or silicon nitride. In the present implementation, gratings $104_{(i-2)}$, $104_{(i-1)}$, $104_{(i)}$, $104_{(i+1)}$, and $104_{(i+2)}$ may include silicon, such as polycrystalline silicon or amorphous silicon. In other implementations, gratings $104_{(i-2)}$, $104_{(i-1)}$, $104_{(i)}$, $104_{(i+1)}$, and $104_{(i+2)}$ may include gallium arsenide (GaAs), indium phosphide (InP), and other suitable high refractive index semiconductor material.

As illustrated in FIG. 1, in the present implementation gratings $104_{(i-2)}$, $104_{(i-1)}$, $104_{(i)}$, $104_{(i-1)}$, and $104_{(i+2)}$ may each have a planar top surface and a constant grating thickness, $T_g$. The spaces between gratings $104_{(i-2)}$, $104_{(i-1)}$, $104_{(i)}$, $104_{(i+1)}$, and $104_{(i+2)}$ may be filled with low refractive index material, such as air. For example, grating $104_{(i)}$ has a width, $w_{g(i)}$, and is laterally spaced from grating $104_{(i+1)}$ by a low refractive index material, such as air, having a width, $w_{air(i)}$. Similarly, grating $104_{(i-2)}$ has a width, $w_{g(i-2)}$, and is laterally spaced from grating $104_{(i-1)}$ by a low refractive index material, such as air, having a width, $w_{air(i-2)}$. Grating $104_{(i-1)}$ has a width, $w_{g(i-1)}$, and is laterally spaced from grating $104_{(i)}$ by a low refractive index material, such as air, having a width, $w_{air(i-1)}$. Grating $104_{(i+1)}$ has a width, $w_{g(i+1)}$, and is laterally spaced from grating $104_{(i+2)}$ by a low refractive index material, such as air, having a width, $w_{air(i+1)}$. Grating $104_{(i+2)}$ has a width, $w_{g(i+2)}$. It is noted that gratings $104_{(i-2)}$, $104_{(i-1)}$, $104_{(i)}$, $104_{(i+1)}$, and $104_{(i+2)}$ in HICG structure 100 are subwavelength gratings. For example, the spacing between each two adjacent gratings (e.g., $104_{(i)}$ and $104_{(i+1)}$) is less than the free space wavelength of light.

As illustrated in FIG. 1, a periodicity, $\Lambda$, for a unit cell containing a grating is the spacing between the grating of the unit cell and a grating of an adjacent unit cell along the x-axis. For example, periodicity $\Lambda_{(i)}$ for the unit cell having grating $104_{(i)}$ is the spacing between the mid point of grating $104_{(i)}$ and the mid point of grating $104_{(i+1)}$ along the x-axis. Similarly, periodicity $\Lambda_{(i-1)}$ for the unit cell having grating $104_{(i-1)}$ is the spacing between the mid point of grating $104_{(i-1)}$ and the mid point of grating $104_{(i)}$ along the x-axis. Periodicity $\Lambda_{(i+1)}$ for the unit cell having grating $104_{(i+1)}$ is the spacing between the mid point of grating $104_{(i+1)}$ and the mid point of grating $104_{(i+2)}$ along the x-axis. Periodicity $\Lambda_{(i-2)}$ for the unit cell having grating $104_{(i-2)}$ is the spacing between the mid point of grating $104_{(i-2)}$ and the mid point of grating $104_{(i-1)}$ along the x-axis.

In FIG. 1, each unit cell has a duty cycle, DC, which may be a ratio of the width of a grating of a unit cell to the periodicity of the unit cell. For example, grating $104_{(i)}$ has duty cycle, $DC_{(i)}$, where $DC_{(i)} = w_{g(i)}/\Lambda_{(i)}$. Similarly, gratings $104_{(i-2)}$, $104_{(i-1)}$, $104_{(i+1)}$, and $104_{(i+2)}$, also have their corresponding duty cycles.

It is noted that, gratings $104_{(i-2)}$, $104_{(i-1)}$, $104_{(i)}$, $104_{(i+1)}$, and $104_{(i+2)}$ may include a high refractive index material that has low propagation loss. For example, amorphous silicon may have low propagation loss of less than 1 dB/cm for wavelengths from 2 to 7 microns. Polycrystalline silicon may have low propagation loss of less than 1 dB/cm for wavelengths from 2 to 9 microns. In addition, low refractive index substrate 104 may include a low refractive index material that also has low propagation loss. For example, sapphire may have low propagation loss of less than 1 dB/cm for wavelengths from 2 to 7 microns. By contrast, conventional glass gratings may only operate with low propagation loss in a very limited range between 3 and 15 microns, and may become very lossy outside of this range. A ratio between gratings $104_{(i-2)}$, $104_{(i-1)}$, $104_{(i)}$, $104_{(i+1)}$, and $104_{(i+2)}$ and low refractive index substrate 102 may be greater than or equal to 2. The high ratio may help achieve a large reflection bandwidth from HICG structure 100.

Since the transmissivity and/or reflectivity in a HICG structure is strongly related to the constructive or destructive interference in the gratings, grating thickness $T_g$ is essential to achieve high reflection or high transmission efficiency. In operation, when HICG structure 100 is utilized to reflect a light wave (not explicitly shown in FIG. 1), the light wave may excite multiple modes in gratings $104_{(i-2)}$, $104_{(i-1)}$, $104_{(i)}$, $104_{(i+1)}$, and $104_{(i+2)}$ with a propagation direction along the z-axis, for example. The multiple excited modes may propagate along the z-axis within gratings $104_{(i-2)}$, $104_{(i-1)}$, $104_{(i)}$, $104_{(i+1)}$, and $104_{(i+2)}$, and reflect back at the top surface of low refractive index substrate 102. When HICG structure 100 is utilized to transmit a light wave, the multiple excited modes may propagate along the z-axis within gratings $104_{(i-2)}$, $104_{(i-1)}$, $104_{(i)}$, $104_{(i+1)}$, and $104_{(i+2)}$, and transmit through the top surface of low refractive index substrate 102.

In the present implementation, gratings $104_{(i-2)}$, $104_{(i-1)}$, $104_{(i)}$, $104_{(i+1)}$, and $104_{(i+2)}$ may have grating thickness $T_g$ of approximately 0.5-1 microns, and may each have a width in a range of approximately 1-2.5 microns. In the present implementation, periodicities $\Lambda_{(i-2)}$, $\Lambda_{(i-1)}$, $\Lambda_{(i)}$, and $\Lambda_{(i+1)}$ may be in a range of approximately 1-4 microns. Low refractive index substrate 102 may have a thickness of approximately 3 microns. In other implementations, grating thickness $T_g$ vary based on the particular incident wavelength. The widths, duty cycles, and periodicities of gratings $104_{(i-2)}$, $104_{(i-1)}$, $104_{(i)}$, $104_{(i+1)}$, and $104_{(i+2)}$ may vary depending on the desired reflected or transmitted amplitude/phase profiles, as discussed detail below. Also, low refractive index substrate 102 may have a thickness greater or less than 3 microns.

In an implementation, more than one HICG structures 100 may be stacked on top of one another along the z-axis to achieve specific transmission and/or reflection amplitude and phase profiles. In another implementation, the thicknesses of low refractive index substrate 102 and gratings $104_{(i-2)}$, $104_{(i-1)}$, $104_{(i)}$, $104_{(i+1)}$, and $104_{(i+2)}$ may vary, when one or more HICG structures 100 are stacked on top of one another along the z-axis.

Figure 2:
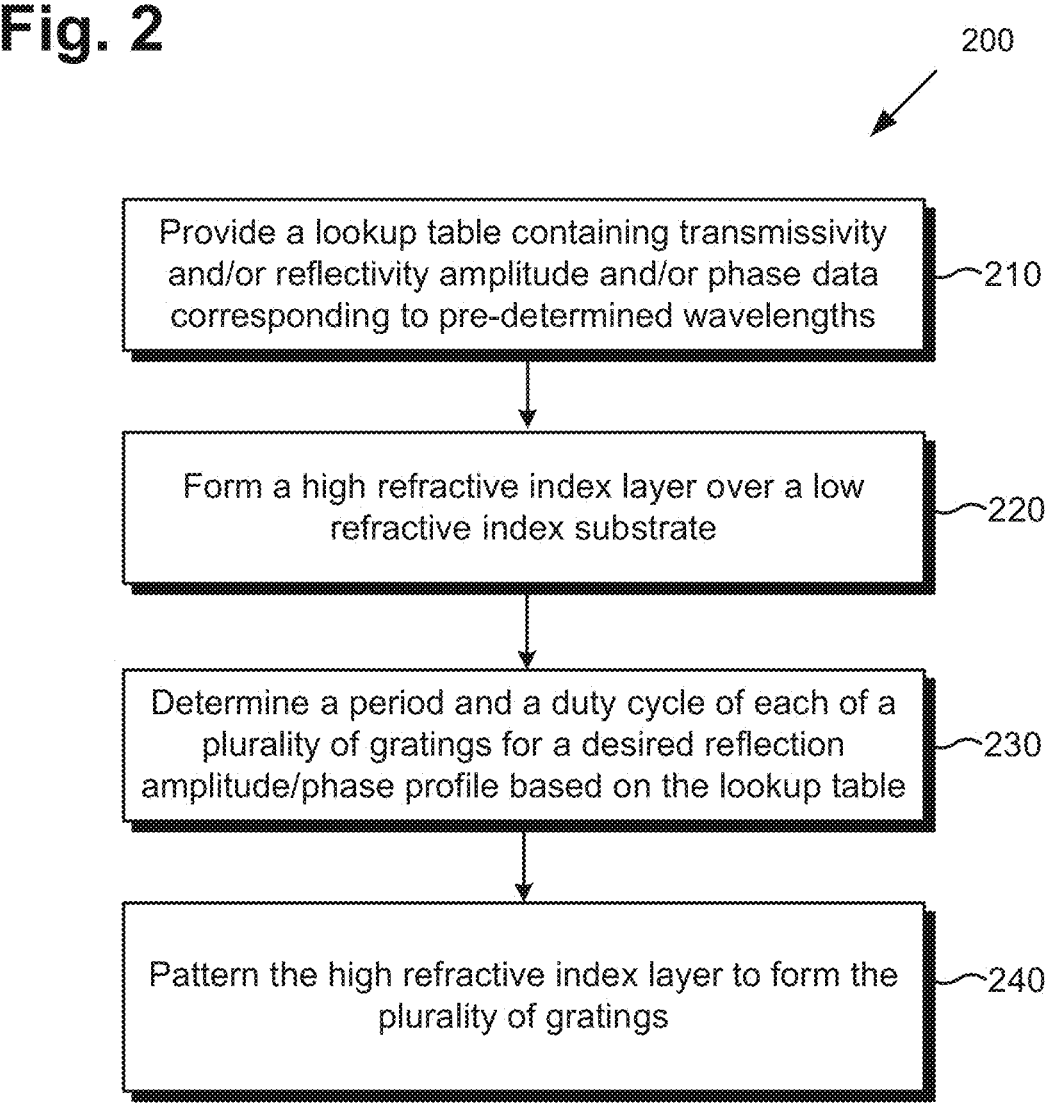
FIG. 2 is a flowchart illustrating a method of forming a HICG structure, according to one implementation of the present application.

FIG. 2 is a flowchart illustrating an exemplary method of forming a HICG structure, according to one implementation of the present application. Certain details and features have been left out of flowchart 200 that are apparent to a person of ordinary skill in the art. For example, an action may consist of one or more subactions or may involve specialized equipment or materials, as known in the art. Actions 210 through 240 indicated in flowchart 200 are sufficient to describe one implementation of the present inventive concepts, other implementations of the present inventive concepts may utilize actions different from those shown in flowchart 200.

Figure 3:
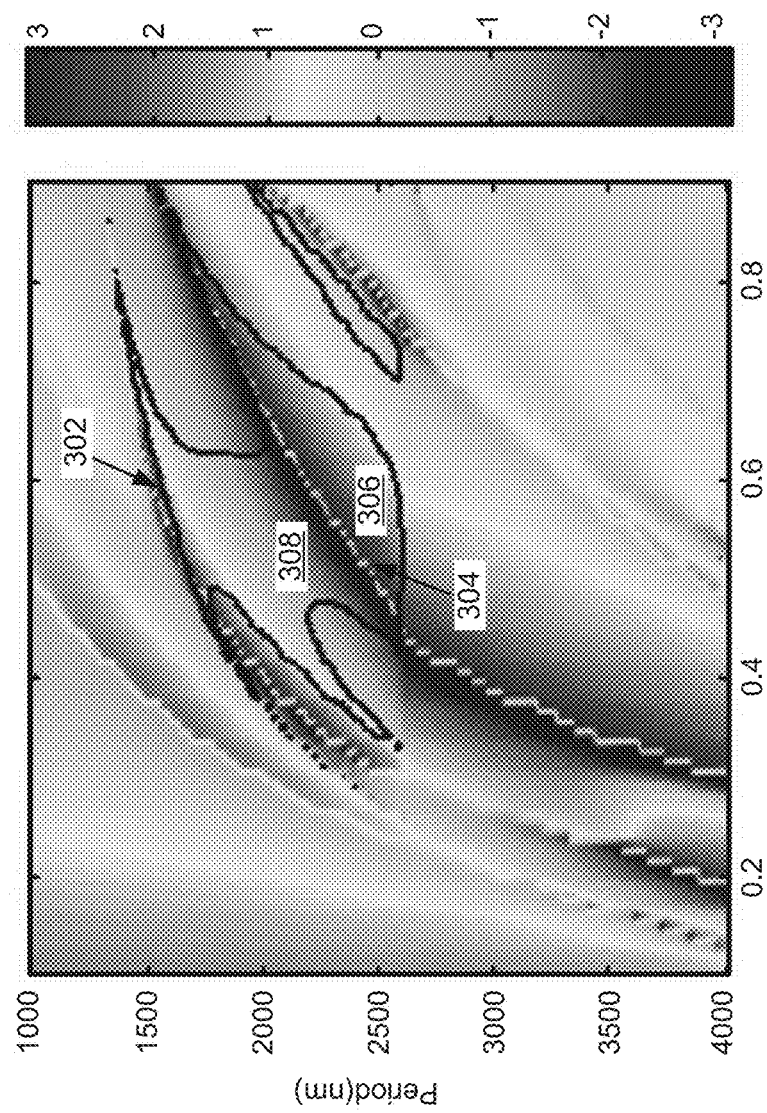
FIG. 3 illustrates an exemplary phase profile as a function of periodicity and duty cycle for a specific wavelength at a given grating thickness, according to one implementation of the present application.

As illustrated in FIG. 2, in flowchart 200, action 210 includes providing a lookup table containing transmissivity and/or reflectivity amplitude and/or phase data corresponding to pre-determined wavelengths. For example, FIG. 3 illustrates an exemplary phase distribution profile of a reflected wave of different grating periodicities and duty cycles for a silicon-on-sapphire HICG structure for a mid-infrared wavelength (e.g., a 4.3 microns normal incident wave, TM polarized, grating thickness $T_g=3.5$ microns). As illustrated in FIG. 3, the area enclosed by phase contour 302 has a reflectivity greater than 90%. Sawtooth line 304 between region 306 (+π) and region 308 (−π) corresponds to the phase wrapping at ±π. As shown in FIG. 3, a phase difference of greater than 2π can be achieved within the area enclosed by phase contour 302, where the reflectivity is greater than 90%. FIG. 3 may be an example of a lookup table containing reflectivity phase data corresponding to a pre-determined wavelength (e.g., 4.3 microns) and a pre-determined grating thickness (e.g., $T_g=3.5$ microns).

Referring to FIG. 2, in flowchart 200, action 220 includes forming a high refractive index layer over a low refractive index substrate. In an implementation, a high refractive index polycrystalline silicon or amorphous silicon layer may be deposited over a low refractive index sapphire substrate using any known technique. In other implementations, the low refractive index substrate may include dielectric material, such as silicon dioxide or silicon nitride. The high refractive index layer may include gallium arsenide (GaAs), indium phosphide (InP), and other suitable high refractive index semiconductor material. A ratio between the high refractive index layer and the low refractive index substrate may be greater than or equal to 2. The high ratio may help achieve a large reflection bandwidth from the HICG structure.

In flowchart 200, action 230 includes determining a periodicity and a duty cycle of each of a plurality of gratings for a desired transmission and/or reflection amplitude and/or phase profile based on a lookup table. A desired amplitude and/or phase profile of a transmitted/reflected wave of a given wavelength is a function of grating thickness $T_g$, periodicity Λ, and duty cycle of a grating structure. For example, a desired phase of a reflected wave profile along an x-axis, $\phi_x$, is a function of grating thickness $T_g$, periodicity Λ, and duty cycle DC, as $\phi(T_g,\Lambda,DC)$. By choosing a proper grating thickness $T_g$, a wide range of reflected phase profile $\phi(\Lambda,DC)$ can be achieved by tuning the periodicities and duty cycles of the gratings, for example, along sawtooth line 304 in FIG. 3 within the area enclosed by phase contour 302, while maintaining a reflectivity of greater than 90%.

For example, a desired phase profile of a reflected wave along the x-axis, $\phi_x$, is a function of x along the x-axis, as $$\phi_x = \phi_x(T_g, \Lambda, DC) = f(x). \quad (1)$$

In particular, the phase profile at a specific location, $x_i$, is $\phi(x_i)$, which is a function of the periodicity of the unit cell at $x_i$, the duty cycle of the unit cell at $x_i$, and the periodicity of the nearest unit cell at $x_{i-1}$, as $$\phi_{x_i} = f(x_i) = f\left(x_{i-1}, \frac{\Lambda_{i-1}}{2}, \frac{\Lambda_i}{2}, DC_i\right). \quad (2)$$

By knowing a desired phase profile of a reflected wave at a specific wavelength, the corresponding periodicity and duty cycle of each unit cell along the x-axis can be determined using, for example, a recursive algorithm. For example, a recursive algorithm for finding the periodicities and duty cycles of the unit cells along the x-axis for a phase function of a reflected wave $f(x)$ can start at $x_i$ with index i=0. Since $$\phi_{x_i} = f(x_i) = f\left(x_{i-1}, \frac{\Lambda_{i-1}}{2}, \frac{\Lambda_i}{2}, DC_i\right) = \phi(\Lambda_i, DC_i), \quad (3)$$

by knowing the desired value of the phase profile $\phi(x_i)$ at location $x_i$, the periodicity $\Lambda_i$ and duty cycle $DC_i$ at location $x_i$ can be determined, for example, based on a lookup table, such as the one shown in FIG. 3. The recursive algorithm may keep looking for the values of the periodicity $\Lambda_i$ and duty cycle DC, till $\phi(p_i,DC_i)=f(x_i)$ is obtained. Then, the above actions can be repeated, such that the index i of $x_i$ is incremented each time by 1 till the periodicity and duty cycle at location $x_i$ where i=n, are obtained. As such, the periodicity and duty cycle pairs satisfying Equation (2) can be progressively and iteratively obtained based on the lookup table, while subject to the restriction of high reflectivity level to achieve high power efficiency. It is noted that by using the location and periodicity of the nearest unit cell at location $x_{i-1}$ in determining the periodicity and duty cycle of the unit cell at location $x_i$, the algorithm can minimize the change between adjacent grating lines.

In flowchart 200, action 240 includes patterning the high refractive index layer to form the plurality of gratings having the determined periodicities and duty cycles. Specifically, after the periodicity and duty cycle of each unit cell in the grating structure is determined in action 230, the structure formed in action 210 may undergo an etching process. For example, a hardmask layer (e.g., a $SiO_2$ layer) may be formed on a high refractive index layer over a low refractive index substrate. Then, a photoresist mask may be formed on the hardmask. The photoresist mask may be defined and patterned by using standard photolithography processing, based on the periodicity and duty cycle of each of the unit cells determined for a desired transmitted and/or reflected amplitude and/or phase profile. Portions of the hardmask not covered by the photoresist mask may be removed by any suitable removal technique. Thereafter, the photoresist mask is removed.

While the patterned hardmask is still over the high refractive index layer, portions of the high refractive index layer not covered by the patterned hardmask are removed by, for example, an etching process. In the present implementation, a plasma or dry etching process may be used. For example, an anisotropic dry reactive ion etch may be performed to remove the entire depth of the high refractive index layer not covered by the hardmask. In other implementations, various wet etching techniques can also be utilized. Thereafter, the hardmask may be removed. As a result, a HICG structure, such as HICG structure 100 in FIG. 1, may be formed using commercially available photolithography equipment. The HICG structure can be formed from silicon-on-sapphire (SOS) wafers, which are compatible with silicon on insulator fabrication processes, thereby reducing manufacturing cost.

In other implementations, the etching process may only remove the high refractive index layer not covered by the hardmask to a certain depth, such that the spaces between the gratings may be partially filled with the remaining portions of the high refractive index material. As a result, a HICG structure may include high refractive index rib waveguides over a low refractive index substrate.

Implementations of the present inventive concepts may be manifested in the following examples for light manipulation. These examples are intended for illustrative purposes only, and not intended to limit the scope of the present application.

Example I—Mid-Infrared Mirror

As an example, a HICG structure may be designed using the methodology described above, such that a reflected wave normal incident upon the HICG structure may have amplitude and phase profiles of a mid-infrared mirror, according to one implementation of the present application.

Figures 4A, 4B:
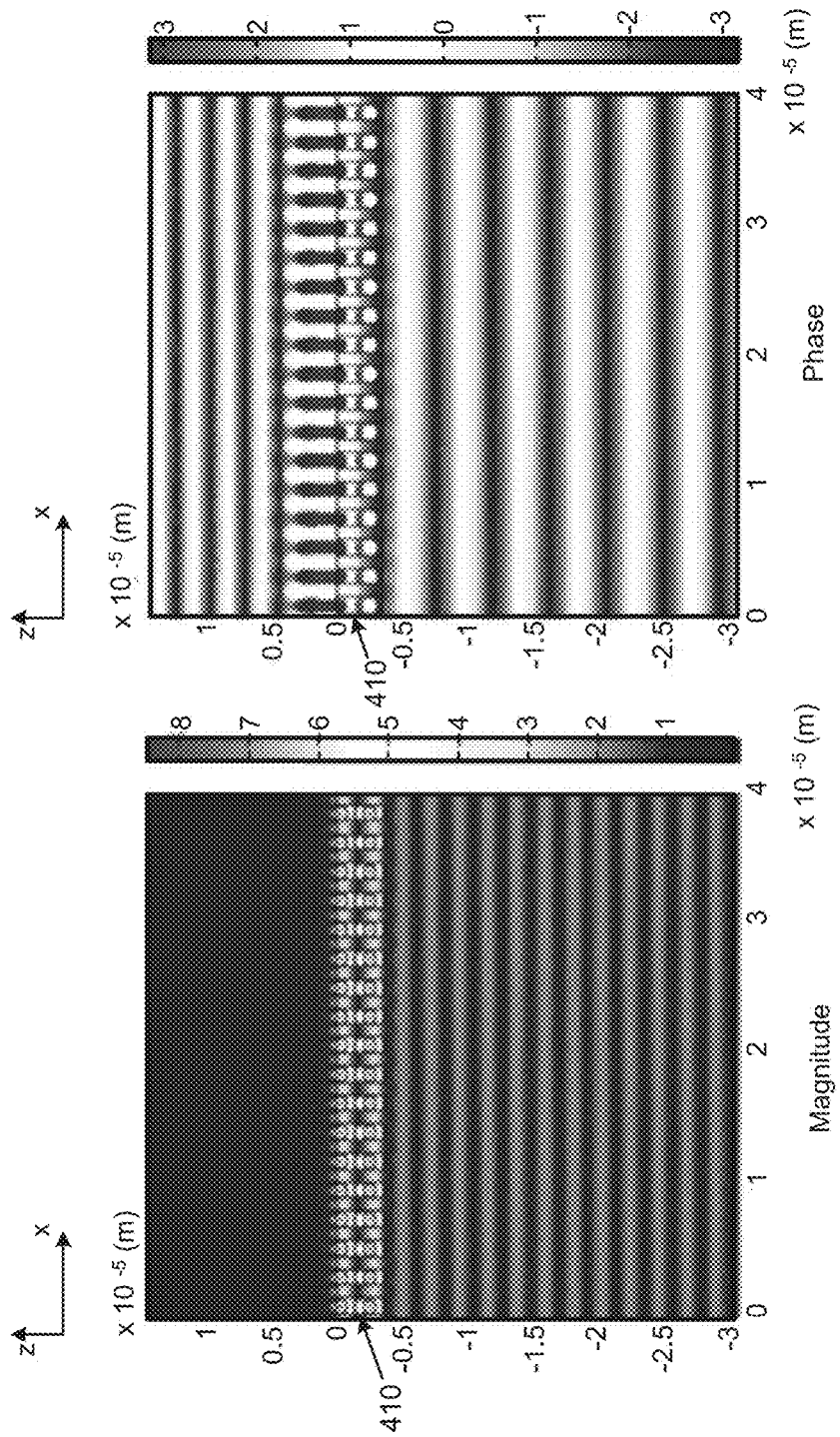
FIG. 4A illustrates a simulated magnitude plot of a reflected wave normal incident upon a HICG structure functioning as a reflective mid-infrared mirror with near 100% reflectivity, according to one implementation of the present application.
FIG. 4B illustrates a simulated phase plot of a reflected wave normal incident upon a HICG structure functioning as a reflective mid-infrared mirror with near 100% reflectivity, according to one implementation of the present application.

FIGS. 4A and 4B respectively show a simulated amplitude plot and a simulated phase plot of a reflected wave normal incident upon HICG structure 410 where HICG structure 410 functions as a reflective mirror, as an implementation of the present application. When a wave (not explicitly shown in FIGS. 4A and 4B) is incident upon HICG structure 410 at a normal angle to the x-axis (i.e., along the z-axis), the reflected components of the normal incident wave may develop a phase profile along the x-axis. For a reflective mirror, an ideal phase distribution profile along the x-axis of a normal incident wave may be expressed as $$\phi(x_i) = C \qquad (4)$$

where C is a constant.

Based on Equation (4), a lookup table containing reflectivity phase data corresponding to a particular wavelength can be obtained. By utilizing the lookup table and Equation (2) discussed above, the periodicity and duty cycle of a grating at location $x_i$ may be determined based on the desired phase distribution profile of a reflective mirror. Since the phase distribution profile is constant across the x-axis, no complicated recursive algorithm is required.

In this example, HICG structure 410 may include uniform sub-wavelength gratings having a constant periodicity of approximately 2.2 microns, and a constant duty cycle of approximately 55%, for incident wave of 4.3 microns corresponding to $CO_2$ absorption peak. As shown in FIGS. 4A and 4B, standing wave pattern in both the amplitude and phase show the ideal reflection mirror behavior. Due to the sub-wavelength nature of HICG structure 410, only the 0-th order may exist. As a result, HICG structure 410 may achieve a reflectivity of nearly 100%.

Example II—Blazed Grating

As an example, a HICG structure may be designed using the methodology described above, such that a reflected wave normal incident upon the HICG structure may have amplitude and phase profiles of a blazed grating, according to one implementation of the present application.

Figures 5A, 5B, 5C:
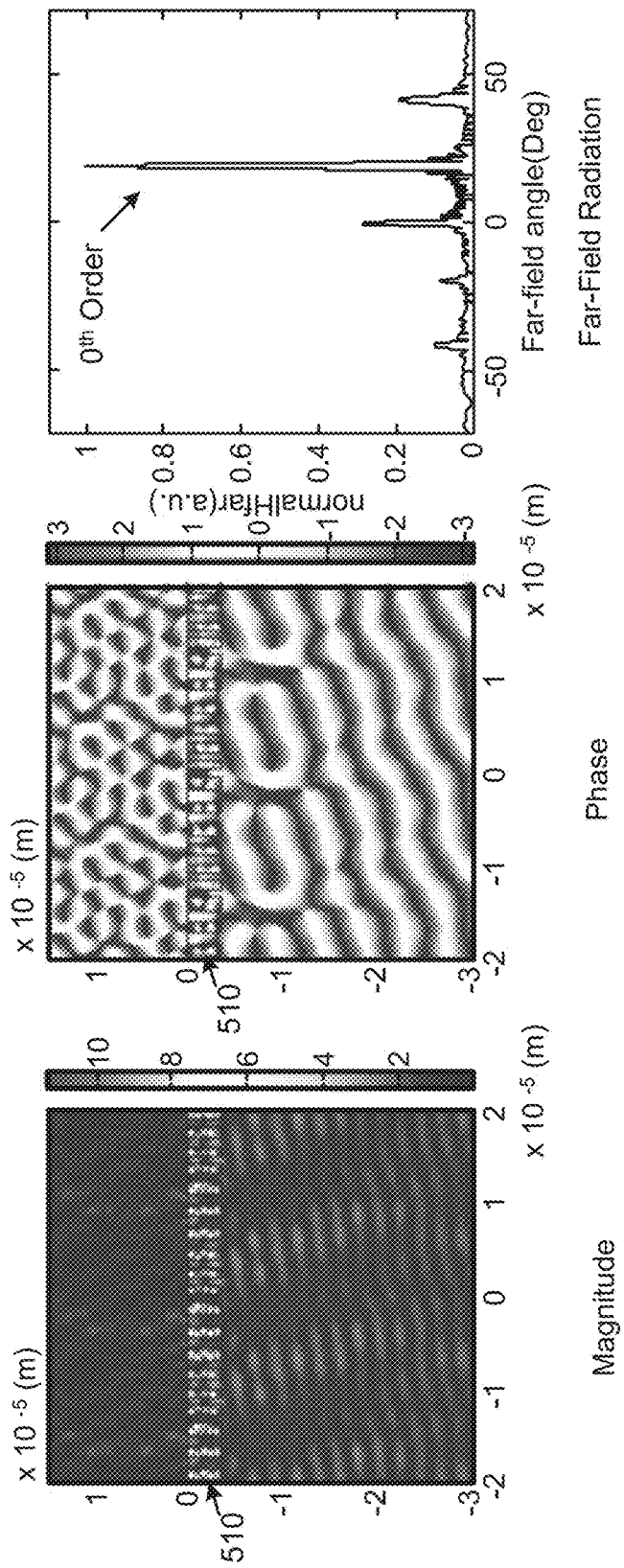
FIG. 5A illustrates a simulated magnitude plot of a reflected wave normal incident upon a HICG structure functioning as a blazed grating, according to one implementation of the present application.
FIG. 5B illustrates a simulated phase plot of a reflected wave normal incident upon a HICG structure functioning as a blazed grating, according to one implementation of the present application.
FIG. 5C illustrates a far-field radiation of a reflected field normal incident upon a HICG structure functioning as blazed gratings with different blazed angles, according to one implementation of the present application.

FIGS. 5A and 5B respectively show a simulated magnitude plot and a simulated phase plot of a reflected wave normal incident upon HICG structure 510 where HICG structure 510 functions as a blazed grating, as an implementation of the present application. When a wave (not explicitly shown in FIGS. 5A and 5B) is incident upon HICG structure 510 at a normal angle to the x-axis (i.e., along the z-axis), the reflected components of the normal incident wave may develop a phase profile along the x-axis. For a blazed grating, an ideal phase distribution profile along the x-axis of a normal incident wave may be expressed as $$\phi(x_i) = \phi(x_0) + \frac{2\pi}{\Lambda} x_i \qquad (5)$$

where $\Lambda$ is the super-cell consisted of sub-gratings with different geometrical parameters.

Based on Equation (5), a lookup table containing reflectivity phase data corresponding to a particular wavelength can be obtained. By utilizing the lookup table along with Equation (2) discussed above, the periodicity and duty cycle of each grating at location $x_i$ may be determined based on the desired phase distribution profile. Using the recursive algorithm discussed above, the periodicity and duty cycle of the gratings in HICG structure 510 at locations from $x_i = x_{-n}$ to $x_i = x_n$ may be determined.

As shown in FIG. 5A, a simulated result of a blazed grating structure with 6 grating sub-cells in each super-cell repeating along the x-axis. The periodicity of the super-cell is $\Lambda = 13$ μm. As can be seen in FIG. 5A, the simulated magnitude plot of a normal TM polarized incident wave shows an angled reflection. As can be seen in FIG. 5B, the simulated phase plot of a normal TM polarized incident wave also shows an angled reflection.

FIG. 5C illustrates a far-field radiation of a reflected field normal incident upon HICG structure 510 in FIG. 5A with different blazed angles, as an implementation of the present application. As can be seen in FIG. 5C, the 0-th order reflection has a blazed angle of approximately 19.5°. Higher order reflections are also present in FIG. 5C.

Example III—Focusing Reflector

As an example, a HICG structure may be designed using the methodology described above, such that a reflected wave normal incident upon the HICG structure may have amplitude and phase profiles of a focusing reflector, according to one implementation of the present application.

FIG. 6A illustrates a cross sectional view of a HICG structure functioning as a focusing reflector, as an implementation of the present application. FIG. 6B illustrates a phase distribution profile of a reflected wave normal incident upon the HICG structure in FIG. 6A functioning as focusing reflector, as an implementation of the present application.

As illustrated in FIG. 6A, HICG structure 610 includes low refractive index substrate 602 and a plurality of gratings 604, similar to HICG structure 100 in FIG. 1A with similar numerals representing similar features. When a wave (not explicitly shown in FIG. 6A) is incident upon HICG structure 600 at a normal angle to the x-axis (i.e., along the z-axis), the reflected components of the normal incident wave may develop a phase profile along the x-axis. For a focusing reflector, an ideal phase distribution profile along the x-axis of a normal incident wave may be expressed as $$\phi(x_i) = \phi(x_0) + \frac{2\pi}{\lambda} \left( \sqrt{F^2 + x_i^2} - F \right) \qquad (6)$$

where F is the focal length, and $\lambda$ is the wavelength of an incident wave.

Based on Equation (6), a lookup table containing reflectivity phase data corresponding to a particular wavelength can be obtained based on a desired focal length and a specific incident wavelength. By utilizing the lookup table along with Equation (2) discussed above, the periodicity and duty cycle of each grating at location $x_i$ may be determined based on the desired phase distribution profile. Using the recursive algorithm discussed above, the periodicity and duty cycle of the gratings at locations from $x_i = x_{-n}$ to $x_i = x_n$ may be determined.

As shown in FIG. 6B, solid line curve 606 may represent the ideal phase distribution profile for a focusing reflector, and the black dots may represent the phase profile of a reflected normal incident wave. As can be seen in FIG. 6B, doted curve 608 falls on the ideal phase distribution profile, which shows that HICG structure 610 has a desired reflected phase profile of a focusing reflector.

FIG. 6C illustrates a simulated field plot of a reflected wave normal incident upon a HICG structure functioning as a focusing reflector, as an implementation of the present application. Specifically, HICG structure 610 is designed to have a desired focal length F=35 microns. As shown in FIG. 6C, the focusing of energy is located at focal spot 640, which is approximately 35 microns from HICG structure 610 along the z-axis.

FIG. 6D illustrates a simulated phase profile of a reflected wave normal incident upon HICG structure 610 in FIG. 6C along dash line 620, as an implementation of the present application. As can be seen in FIG. 6D, simulated phase profile curve 650 shows a nearly quadratic phase profile, and closely follows desired phase profile curve 660 between x=−25 microns to x=25 microns.

FIG. 6E illustrates a simulated power flow distribution of a reflected wave normal incident upon HICG structure 610 in FIG. 6C along dash line 630 through focal spot 640, as an implementation of the present application. As can be seen in FIG. 6E, diffraction-limited focusing is achieved and 62% of the energy is confined within an approximately 2-micron radius spot.

Example IV—Sinusoidal Phase Reflector

As an example, a HICG structure may be designed using the methodology described above, such that a reflected wave normal incident upon the HICG structure may have sinusoidal amplitude and phase profiles, according to one implementation of the present application.

FIGS. 7A and 7B respectively show a simulated magnitude plot and a simulated phase plot of a reflected wave normal incident upon HICG structure 710 where HICG structure 710 has a reflected sinusoidal phase distribution, as an implementation of the present application. When a wave (not explicitly shown in FIGS. 7A and 7B) is incident upon HICG structure 710 at a normal angle to the x-axis (i.e., along the z-axis), the reflected components of the normal incident wave may develop a phase profile along the x-axis. For a grating structure with sinusoidal phase distribution, an ideal phase distribution profile along the x-axis of a normal incident wave may be expressed as $$\phi(x_i) = \phi(x_0) + A\sin\left(\frac{2\pi}{\Lambda}x_i\right). \quad (7)$$

Based on Equation (7), a lookup table containing reflectivity phase data corresponding to a particular wavelength can be obtained. By utilizing the lookup table along with Equation (2) discussed above, the periodicity and duty cycle of each grating at location $x_i$ may be determined based on the desired phase distribution profile. Using the recursive algorithm discussed above, the periodicity and duty cycle of the gratings in HICG structure 710 at locations from $x_i=x_{-n}$ to $x_i=x_n$ may be determined.

FIG. 7C illustrates a sinusoidal phase distribution of a reflected field normal incident upon HICG structure 710 along dash line 720 in FIG. 7A, as an implementation of the present application.

Example V—Diffraction Grating

As an example, a HICG structure may be designed using the methodology described above, such that a reflected wave normal incident upon the HICG structure may have amplitude and phase profiles of a diffraction grating, according to one implementation of the present application.

As illustrated in FIG. 8A, a simulated magnitude plot of a reflected wave normal incident upon a HICG structure shows Talbot Effects. As can be seen in FIG. 8A, an image of the gratings is repeated at regular distances away from the grating structure. As illustrated in FIG. 8B, a simulated phase plot of a reflected wave normal incident upon a HICG structure also shows Talbot Effects of repetitive patterns at regular distances away from the grating structure.

It is noted that, although the examples of the present application focus on the reflection properties of HICG structures, it should be understood that the HICG structures according to implementations of the present application may be configured to transmit waves having specific amplitude and phase profiles. In one implementation, the periodicities and duty cycles of a HICG structure may be configured to transmit a wave through the HICG structure, such the HICG structure may function as a focusing lens, a divergence lens, or a high numerical aperture lens. In another implementation, the periodicities and duty cycles of a HICG structure may be configured to transmit a wave through the HICG structure, such that the transmitted wave has amplitude and phase profiles of a diffraction grating. In another implementation, the periodicities and duty cycles of a HICG structure may be configured to reflect a wave, such that the HICG structure functions as a concave mirror, a convex mirror, a focusing lens, or a divergence lens. In another implementation, the periodicities and duty cycles of a HICG structure may be configured to reflect a wave, such that the reflected wave has amplitude and phase profiles of a diffraction grating. In other implementations, a HICG structure may function as a combinatory optical system having multiple optical components on a low refraction index substrate, for example, where each optical components includes gratings with periodicities and duty cycles determined based on the methodologies discussed above.

The present inventive concepts utilize a high index contrast grating structure having a high refractive index ratio between high refractive index gratings and a low refractive index substrate to achieve light manipulation with low loss and high power efficiency for transmission and reflection of plane waves in the mid-infrared and far-infrared spectrum range. According to implementations of the present application, by formed high refractive index gratings with specific periodicities and duty cycles based on the methodology described in the present application, a desired amplitude and/or phase profile of a normal incident wave can be obtained in both transmission and reflection domains. It should be understood that the methods disclosed in the present application are not limited to normal incident plane waves. Also, the methods described in the present application may utilize standard photolithography processes to fabricate grating structures on commercially available silicon on insulator semiconductor wafers, such as silicon on sapphire wafers, thereby reducing manufacturing cost.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

The invention claimed is:

1. A high index contrast grating (HICG) structure comprising:
a plurality of gratings fabricated from a high refractive index layer, said plurality of gratings including a first grating, a second grating adjacent said first grating, and a third grating adjacent said second grating such that said second grating is situated between said third grating and said first grating;
wherein said high refractive index layer is situated over a low refractive index substrate;
and wherein said high refractive index layer is patterned after determining a combination of a period, a thickness, and a duty cycle of each of said plurality of gratings for a desired reflection phase profile;
said combination being determined for said first grating based on a lookup table;
said combination being determined for said second grating using a location and a period of said first grating and based on said lookup table; and
said combination being determined for said third grating using a location and a period of said second grating and based on said lookup table.

2. The HICG structure of claim 1, wherein said low refractive index substrate includes silicon nitride.

3. The HICG structure of claim 1, wherein at least one of said plurality of gratings includes amorphous silicon.

4. The HICG structure of claim 1, wherein at least one of said plurality of gratings includes polycrystalline silicon.

5. The HICG structure of claim 1, wherein said high refractive index layer has a refractive index at least two times greater than that of said low refractive index substrate.

6. The HICG structure of claim 1, wherein said HICG structure includes subwavelength gratings for incident wavelengths of equal to or greater than 2.5 microns.

7. The HICG structure of claim 1, wherein said HICG structure functions as a combinatory optical system having multiple components on said low refractive index substrate.

8. The HICG structure of claim 1, wherein said HICG structure is a mid-infrared reflective mirror having a reflectivity of approximately 100%.

9. The HICG structure of claim 1, wherein said HICG structure has a reflection phase profile of a blazed grating.

10. The HICG structure of claim 1, wherein said HICG structure has a reflection phase profile of a focusing reflector.

11. A method of forming a high index contrast grating (HICG) structure, said method comprising:
providing a lookup table containing transmissivity and/or reflectivity data corresponding to pre-determined wavelengths;
forming a high refractive index layer over a low refractive index substrate;
determining a combination of a period, a thickness, and a duty cycle of each of a plurality of gratings for a desired transmission or reflection profile, said plurality of gratings including a first grating, a second grating adjacent said first grating, and a third grating adjacent said second grating such that said second grating is situated between said third grating and said first grating;
wherein determining said combination for said first grating is performed based on said lookup table;
wherein determining said combination for said second grating is performed using a location and a period of said first grating and based on said lookup table;
wherein determining said combination for said third grating is performed using a location and a period of said second grating and based on said lookup table; and
patterning said high refractive index layer to form said plurality of gratings.

12. The method of claim 11, wherein said transmissivity and/or reflectivity data includes transmissivity and/or reflectivity phase data.

13. The method of claim 11, wherein said transmissivity and/or reflectivity data includes transmissivity and/or reflectivity amplitude data.

14. The method of claim 11, wherein said HICG structure is configured to transmit a wave through said HICG structure, such that said HICG structure functions as a focusing lens, a divergence lens, or a high numerical aperture lens.

15. The method of claim 11, wherein said HICG structure is configured to transmit a wave through said HICG structure, such that said transmitted wave has amplitude and phase profiles of a diffraction grating.

16. The method of claim 11, wherein said HICG structure is configured to reflect a wave, such that said HICG structure functions as a concave mirror, a convex mirror, a focusing lens, or a divergence lens.

17. The method of claim 11, wherein said HICG structure is configured to reflect a wave, such that said reflected wave has amplitude and phase profiles of a diffraction grating.

18. The method of claim 11, wherein said HICG structure is a mid-infrared reflective mirror having a reflectivity of approximately 100%.

19. The method of claim 11, wherein said HICG structure is configured to reflect a wave, such that said reflected wave has amplitude and phase profiles of a blazed grating.

20. The method of claim 11, wherein said HICG structure includes subwavelength gratings for incident wavelengths of equal to or greater than 2.5 microns.

* * * * *